L. W. BROWN & P. A. RASMUS.
TURN TABLE FOR MOTOR VEHICLES.
APPLICATION FILED DEC. 30, 1915.
1,177,478.
Patented Mar. 28, 1916.
3 SHEETS—SHEET 3.
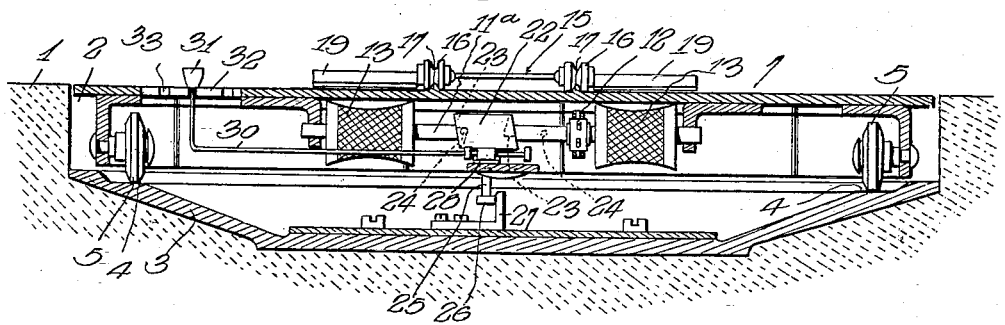
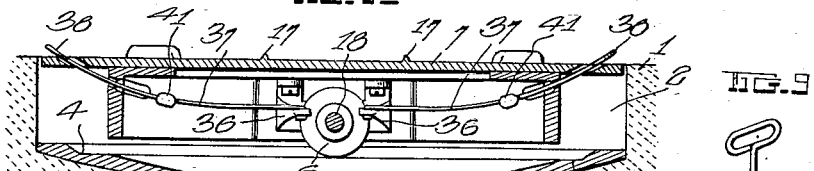
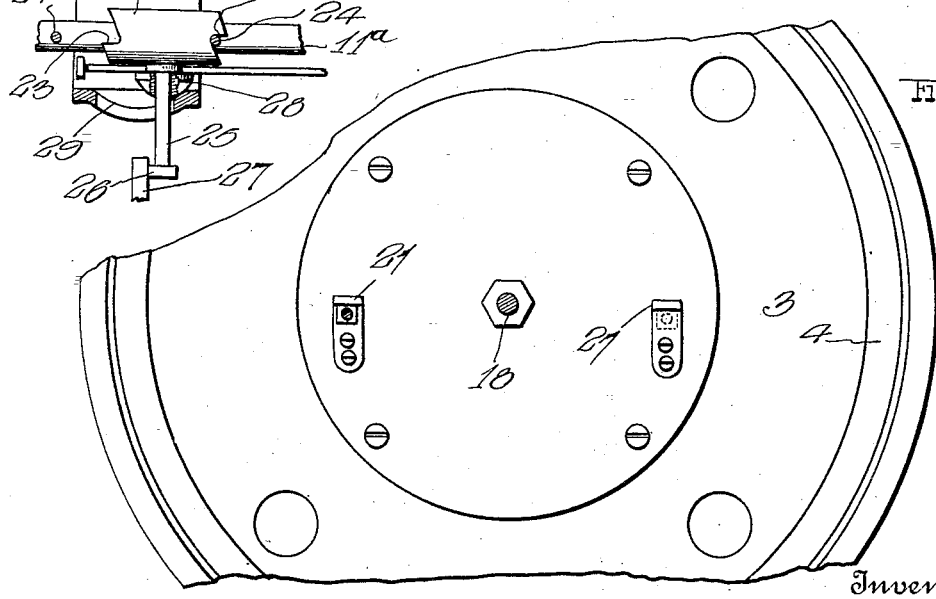
Witnesses
H. Woodard
Inventors
L. W. Brown
P. A. Rasmus
by H. B. Willson & Co.
Attorneys
THE COLUMBIA PLANOGRAPH CO., WASHINGTON, D. C.

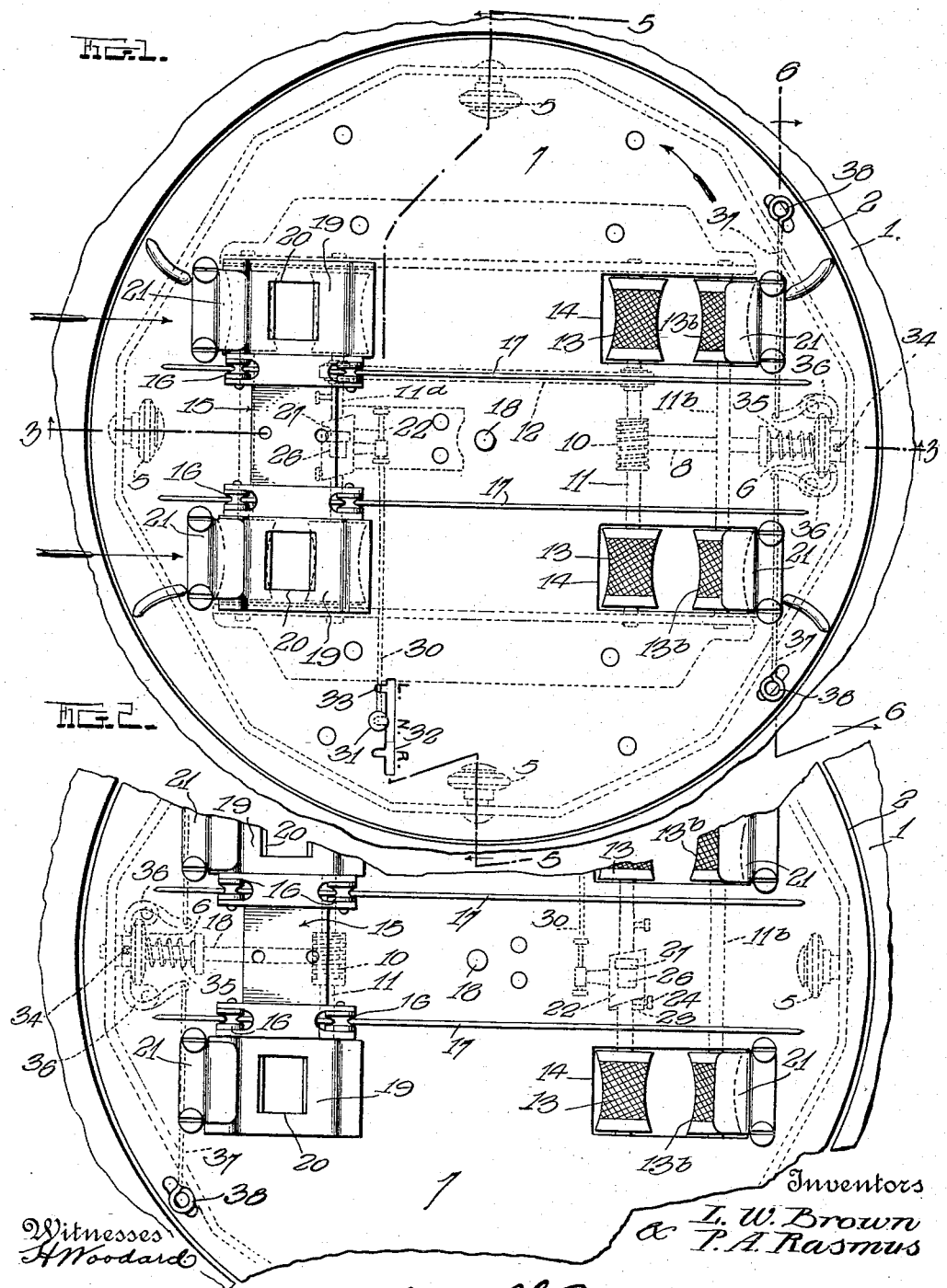

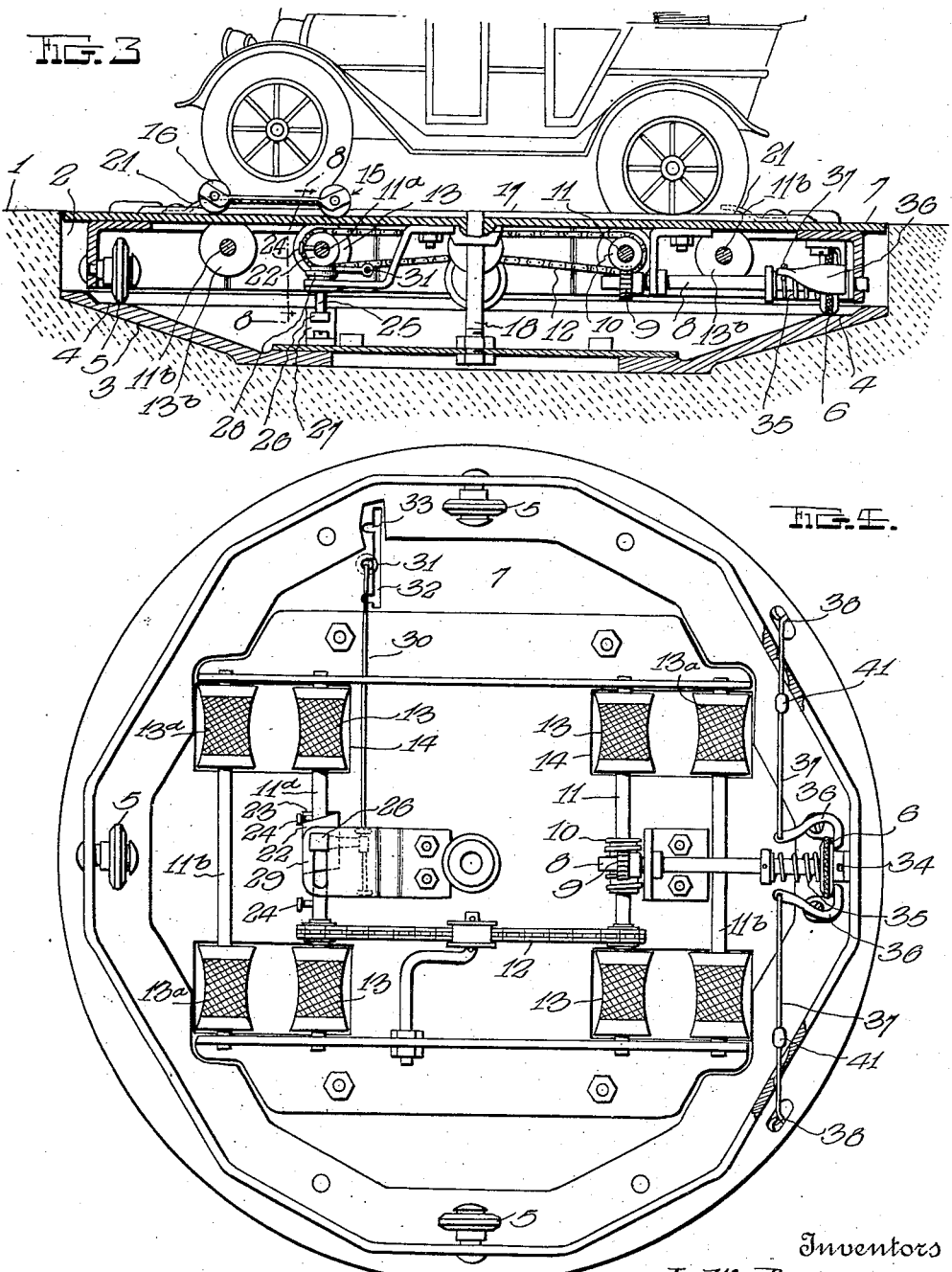

UNITED STATES PATENT OFFICE.

LEON W. BROWN, OF NEW YORK, N. Y., AND PETER A. RASMUS, OF PAXTON, ILLINOIS.

TURN-TABLE FOR MOTOR-VEHICLES.

1,177,478. Specification of Letters Patent. Patented Mar. 28, 1916.

Application filed December 30, 1915. Serial No. 69,435.

*To all whom it may concern:*

Be it known that we, LEON W. BROWN, a citizen of the United States, residing at New York, in the county of New York and State of New York, and PETER A. RASMUS, a citizen of the United States, residing at Paxton, in the county of Ford and State of Illinois, have invented certain new and useful Improvements in Turn-Tables for Motor-Vehicles; and we do declare the following to be a full, clear, and exact description of the invention, such as will enable others skilled in the art to which it appertains to make and use the same.

Our invention relates to improvements in automobile turntables of the class having a predetermined path to receive the vehicle thereon, such tables being equipped with turning mechanism including driving rollers at both ends of said path adapted to be engaged by the driven rear wheels of automobiles. In this type of turntable all of the rollers are necessarily driven simultaneously, and under present conditions, the front wheels of the automobiles often rest partially on the rollers not engaged by the rear wheels, such rollers therefore not only exerting wear on the front tires, but imparting a braking action to the entire operating mechanism.

The main object of the present invention is to overcome the difficulty above set forth by the provision of a carriage movable along the vehicle path of the table and formed with seats to receive the front wheels of the vehicles. By so doing, said front wheels will be spaced above the rollers with which they would otherwise contact, and by allowing the carriage to slide freely on the table, it will readily hold the front wheels regardless of the length of the vehicle.

A further object of the invention is to provide improved means for stopping the operating mechanism of the table at will to allow the vehicle to travel from said table.

Yet another object resides in the provision of a simple arrangement of parts whereby the driving wheel of the table may be disconnected with its shaft, and whereby the device which accomplishes this end may serve as means for manually rotating the table.

With the above general objects in view, the invention resides in certain novel features of construction and in unique combinations of parts to be hereinafter fully described and claimed, the descriptive matter being supplemented by the accompanying drawings which constitute a part of this application, and in which:

Figure 1 is a top plan view of a turntable constructed in accordance with our invention; Fig. 2 is a similar view with parts broken away showing a different position of parts; Fig. 3 is a sectional view taken on the plane of the diametrically extending line 3—3 of Fig. 1; Fig. 4 is a bottom plan view of the table proper and parts carried thereby; Figs. 5 and 6 are vertical sectional views taken on the planes of the lines 5—5 and 6—6 of Fig. 1 respectively; Fig. 7 is a partial top plan view of the base of the machine; Fig. 8 is a detail sectional view taken approximately on the plane indicated by the line 8—8 of Fig. 3; and Fig. 9 is a perspective view of the operating tool.

In specifically describing the invention shown in the drawings above briefly described, similar reference characters will be placed on corresponding parts throughout the several views and reference will be herein made to the numerous elements by their respective indices. To this end, the numeral 1 designates a garage floor having therein a circular pit 2 on whose bottom an appropriate base 3 is anchored, said base having adjacent its edge an annular track 4 upon which the supporting rollers 5 and the driving wheel 6 of the turntable 7 travel, said table being suitably constructed to withstand the strain encountered in use, and being preferably though not necessarily of strictly circular formation.

The driving wheel 6 is mounted on and rotated by a horizontal shaft 8 which is revolubly mounted in appropriate bearing means carried by and beneath the table 7, said shaft having thereon a worm gear 9 which meshes with a worm 10 on a horizontal shaft 11 rotatably mounted beneath and carried by the table 7, said shaft having thereon a sprocket wheel connected by a chain 12 with a similar wheel on a shaft 11ᵃ parallel to but spaced from the shaft 11. The two shafts 11 and 11ᵃ carry serrated rollers 13 which are partially received in rectangular openings 14 formed in the table 7. Disposed parallel to the rollers 13 and likewise partially received in the openings 14, are additional rollers 13ᵃ carried on the ends of idle shafts 11ᵇ.

By the construction so far described, it will be obvious that if an automobile is run upon the table 7 with its rear driven wheels supported by one pair of rollers 13, rotation of said wheels will through the instrumentality of the numerous connections above described, rotate the wheel 6, thus turning the entire table and the machine thereon. However, to prevent the front wheels of the automobile from coming in contact with the rollers 13 not engaged by the aforesaid rear wheels, a carriage 15 is provided, said carriage having grooved rollers 16 mounted on a pair of parallel tracks 17 extending across the table 7 on opposite sides of the upright axis 18 around which it rotates. The carriage 15 is equipped with a pair of horizontal plates 19 adapted to receive thereon the front wheels of the vehicle, said plates having therein seats 20 with which the wheels engage, whereby the entire carriage will be moved from the position shown in Fig. 1 to the opposite ends of its tracks 17, as the automobile moves onto the table 7. Thus, regardless of the length of the wheel base of the vehicle, when the rear wheels of the latter engage one pair of driving rollers 13, the front wheels of said vehicle will be supported by the plates 19 above the other driven rollers and obviously this will prevent the latter from injuring the tires of the former. When the table has revolved the desired amount and is stopped by the means yet to be described, the rollers 13 may no longer rotate, whereupon if the wheels of the vehicle be driven, such vehicle will be propelled from the turntable, and in so doing will move the carriage 15 to one end of its tracks 17 in position to be again used when the next automobile travels onto the machine. The movement of the carriage, in either direction, is limited by the stop plates 21 which are secured to the table adjacent the ends of the tracks 17, said plates being spaced from said table an appropriate distance to receive the ends of the plate 19 thereunder as shown clearly in Figs. 1 and 2.

For mechanically checking the operation of the turning mechanism of the table when the latter has made one half revolution to completely reverse an automobile, the means now to be described is provided.

Slidably mounted on the shaft 11ª is a double ended clutch member 22 in the form of a sleeve having clutch teeth 23 on its opposite ends for engagement with laterally extending slots 24 which are spaced longitudinally on said shaft, the member 22 being interposed between the studs 24 as shown clearly in Figs. 4 and 8. Depending from the member 22 is a rigid stem 25 whose lower end preferably carries a heal 26, the latter being adapted for coöperation with a pair of fixed abutments 27 secured to the base 3 and positioned in diametrically opposite directions from the axis 18. Thus, when an automobile passes onto the table 7 in the direction indicated by the two arrows at the left hand side of Fig. 1, said table will be rotated in the direction indicated by the curved arrow thereon, thereby causing the head 26 to move away from the abutment 27 with which it has previously contacted. The table will now continue to rotate until said head 26 contacts with the other stop 27 as shown in Fig. 2, whereupon the clutch member 22 will be shifted to engage one set of its teeth 23 with one of the stops 24. This will lock all of the rollers 13 against rotation and the automobile will stand in a completely reversed position. The engine is now stopped, and the vehicle is in readiness to be propelled from its garage when necessary. It is to be observed, however, that when removed from the turntable, the automobile will leave the latter in perfect condition to again receive it upon its return.

For the purpose of holding the clutch member 22 in a neutral position while the table 7 is turning, a weight 28 is mounted slidably on the stem 25 (see Fig. 8), said weight resting on a track 29 extending longitudinally of the shaft 11ª. The track in question is formed with a depressed central portion which normally receives therein the weight 28, whereby to hold the member 22 out of engagement with both stops 24. However, when one of the abutments 27 is encountered, the weight 28 will move to the position shown in Fig. 8 as the member 22 is shifted.

If, after the table has rotated less than a half revolution, it is desired to check rotation thereof to allow an automobile to travel therefrom, the rod 30 may be shifted from its normal neutral position shown in the drawings by an appropriate handle 31, said rod having an appropriate sliding connection at its inner end with the member 22, whereby it may be manually engaged with either stop 24 at will. The rod 30 is preferably of the angular formation shown having its upright portion extended through a slot 32 in the table, said slot having a number of lateral offsets 33 into which said upright portion may be sprung to hold the rod in neutral or in either one of its adjusted positions.

It often occurs that it is desirable to rotate the table by hand, and in order to allow this to be done, we provide means whereby the driving wheel 6 may be disconnected from its shaft 8. To this end, the hub of said wheel is notched to receive one or more laterally extending studs 34 carried by the aforesaid shaft, said wheel being normally held in such a position as to engage the notches and studs, this being accomplished by the provision of a coil spring 35. Pivoted to the table and disposed on opposite sides of the shaft 8, is a pair of bell cranks 36, one arm of which bears against the wheel 6 as shown in Fig. 4, the other arms of said cranks being connected to the inner ends of a pair of pulling members 37 which lead through appropriate openings to eccentric points adjacent the edge of the table 7. At such points, the members 37 are provided with eyes 38 to receive a hook 39 on the end of an appropriate operating tool 40 shown in Fig. 9. Thus, when one of the members 37 is pulled outwardly, the wheel 6 will be disconnected from the shaft 8 and a continued pull on said member in the proper direction, will rotate the entire table around its axis. As shown, stops 41 are preferably used on the members 37 to prevent excessive outward movement thereof.

The members 37 above referred to are illustrated in the accompanying drawings in the form of rods, but it is to be understood that they could well be cables or chains.

From the foregoing description, taken in connection with the accompanying drawings, the construction, manner of operation and numerous advantages of the improved mechanism will be readily understood without requiring a more extended explanation. In conclusion, however, we wish to state that although the drawings illustrate certain specific structures and relations of parts, numerous changes and omissions may well be made within the scope of the invention as claimed, should it be desirable to make such alterations in applying the invention to use in different styles of garages.

We claim:—

1. In combination, a turntable having a predetermined path to receive a motor vehicle thereon, means for turning the table including operating devices disposed at the ends of said path to be rotated by the rear driven wheels of the vehicle, and a carriage movable along the aforesaid path and adapted to receive and support the front wheels of the vehicle above the plane of the operating devices.

2. In combination, a turntable having a predetermined path to receive a motor vehicle thereon, means for turning the table including operating devices disposed at the ends of said path to be rotated by the rear driven wheels of the vehicle, and a carriage movable along the aforesaid path and having seats adapted to receive and support the front wheels of the vehicle above the plane of the operating devices.

3. In combination, a turntable having a predetermined path to receive a motor vehicle thereon, means for turning the table including operating devices disposed at the ends of said path to be rotated by the rear driven wheels of the vehicle, a carriage movable along the aforesaid path and adapted to receive and support the front wheels of the vehicle above the plane of the operating devices, and stops for limiting the movement of the carriage beyond the ends of the aforesaid path.

4. In combination, a turntable having a predetermined path to receive a motor vehicle thereon, means for turning the table including operating devices disposed at the ends of said path to be rotated by the rear driven wheels of the vehicle, a carriage movable along the aforesaid path and having horizontal plates adapted to receive and support the front wheels of the vehicle above the plane of the operating devices, said plates having wheel receiving seats, and horizontal stop plates secured to the table at the ends of the aforesaid path and spaced above said table a distance to receive the aforesaid horizontal plates thereunder.

5. In combination, a turntable having a predetermined path to receive thereon a motor vehicle, means for turning the table including an operating device on the aforesaid path to be driven by a driven wheel of the vehicle, and a horizontal shaft rotated by said device, a pair of stops spaced longitudinally on said shaft, a non-rotatable double ended clutch member slidable between said stops and having clutch teeth on its ends for engagement therewith, an upright stem carried by said clutch member, a weight slidable vertically on said stem, a track upon which said weight rests slidably, said track extending longitudinally of the shaft and having a depressed central portion in which said weight is normally received to hold the clutch member in neutral position, and means for shifting said clutch member in either direction.

6. In combination, a turntable having a predetermined path to receive thereon a motor vehicle, turning means for the table including a pair of operating devices disposed at the ends of said path and a horizontal shaft driven by said devices and carried by the table, a pair of stops spaced longitudinally on the shaft, a double ended non-rotatable clutch member slidable between the two stops and having clutch teeth on its ends for engagement therewith, a rigid stem extending from said clutch member, and a pair of fixed abutments spaced in diametrically opposite directions from the axis of the table and disposed in the path of said stem to automatically shift the clutch member into engagement with one stop or the other on the shaft, whereby to lock said shaft and the operating devices against further movement.

7. In combination, a turntable to receive a motor vehicle thereon, a shaft carried by the turntable, means for driving said shaft from the driven wheels of the motor vehicle, an annular track beneath and concentric to the turntable, a driving wheel traveling on the track and mounted slidably on the aforesaid shaft, coöperating slidably engaged means for locking the wheel to the shaft, a spring for normally holding such means in operative position, a crank for shifting said wheel to disengage said means, and a pulling member connected to said crank and leading therefrom to an eccentric point on the table, whereby pulling of said member will first disconnect the driving wheel from its shaft and will then turn the table around its axis.

In testimony whereof we have hereunto set our hands in presence of subscribing witnesses.

LEON W. BROWN.
PETER A. RASMUS.

Witnesses:
F. W. THOBEN,
H. J. HILL,
SIXTEN OLANDER,
ELMER T. LAURENCE.

Copies of this patent may be obtained for five cents each, by addressing the "Commissioner of Patents, Washington, D. C."